(12) United States Patent
Epling

(10) Patent No.: US 8,132,539 B2
(45) Date of Patent: Mar. 13, 2012

(54) PORTABLE CORRAL GATE ASSEMBLY

(76) Inventor: Larry P. Epling, Tucson, AZ (US)

( * ) Notice: Subject to any disclaimer, the term of this patent is extended or adjusted under 35 U.S.C. 154(b) by 320 days.

(21) Appl. No.: 12/260,948

(22) Filed: Oct. 29, 2008

(65) Prior Publication Data

US 2010/0101503 A1 Apr. 29, 2010

(51) Int. Cl.
*A01K 1/00* (2006.01)
(52) U.S. Cl. ......................... 119/524; 119/519
(58) Field of Classification Search .................. 119/481, 119/510, 518, 519, 524, 502, 512–514, 665–667
See application file for complete search history.

(56) References Cited

U.S. PATENT DOCUMENTS

| | | | | |
|---|---|---|---|---|
| 3,970,045 A | * | 7/1976 | Graham, Jr. ................. | 119/514 |
| 6,615,769 B2 | * | 9/2003 | Zhioua ........................ | 119/666 |
| 6,966,276 B2 | * | 11/2005 | Dollar ........................ | 119/667 |
| 7,021,555 B2 | * | 4/2006 | Bagnall ...................... | 239/1 |
| 7,679,517 B2 | * | 3/2010 | Finlayson .................. | 340/573.1 |
| 2009/0217883 A1 | * | 9/2009 | Moore ........................ | 119/514 |

* cited by examiner

*Primary Examiner* — Kristen Hayes
(74) *Attorney, Agent, or Firm* — Dale F. Regelman; Quarles & Brady LLP

(57) ABSTRACT

Apparatus and method for confining livestock with a portable corral gate assembly comprising a bottom frame, a top frame, a plurality of vertical members releaseably interconnecting the bottom frame to the top frame, a plurality of first side members each pivotally attached to a first vertical member and a second end attached to and extending outwardly from a first flexible member attached to the top frame and extending downwardly therefrom, and a plurality of second side members each pivotally attached to a second vertical member and a second end attached to and extending outwardly from a second flexible member attached to the top frame and extending downwardly therefrom.

11 Claims, 11 Drawing Sheets

US 8,132,539 B2

PORTABLE CORRAL GATE ASSEMBLY

FIELD OF THE INVENTION

The invention relates to a portable corral gate assembly and method for herding animals.

BACKGROUND OF THE INVENTION

From time to time, ranchers have a need to gather livestock in a corral or water trap. On occasion, it is desirable to trap livestock in remote areas of a range, thereby eliminating time and effort to gather those cattle. There is a need to have a portable corral gate assembly that can be easily disassembled, transported on a pack horse, and reassembled.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
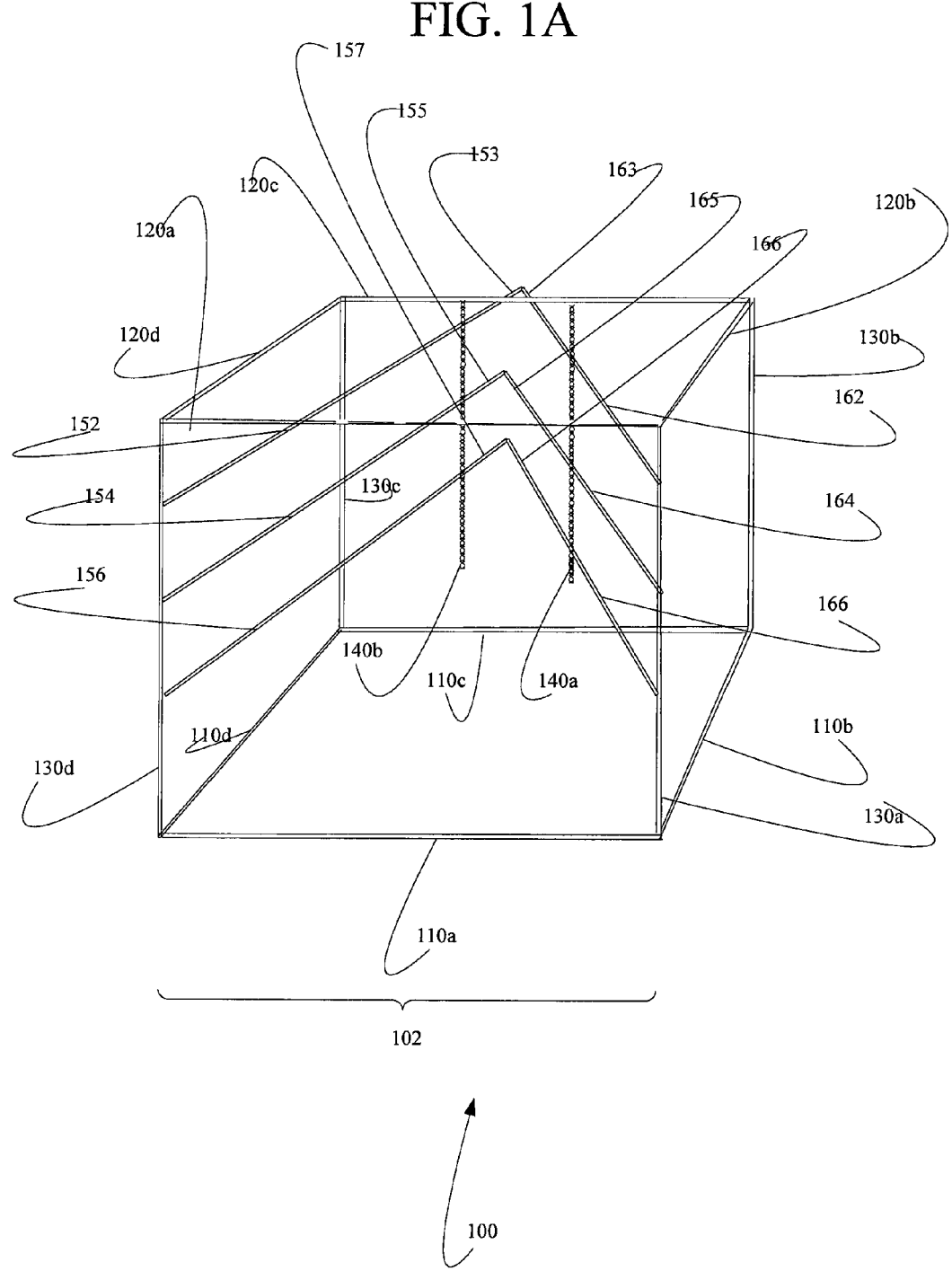
FIG. 1A is a perspective view from an entry side of Applicant's portable corral gate assembly, wherein that assembly is in a closed configuration.
Figure 1B:
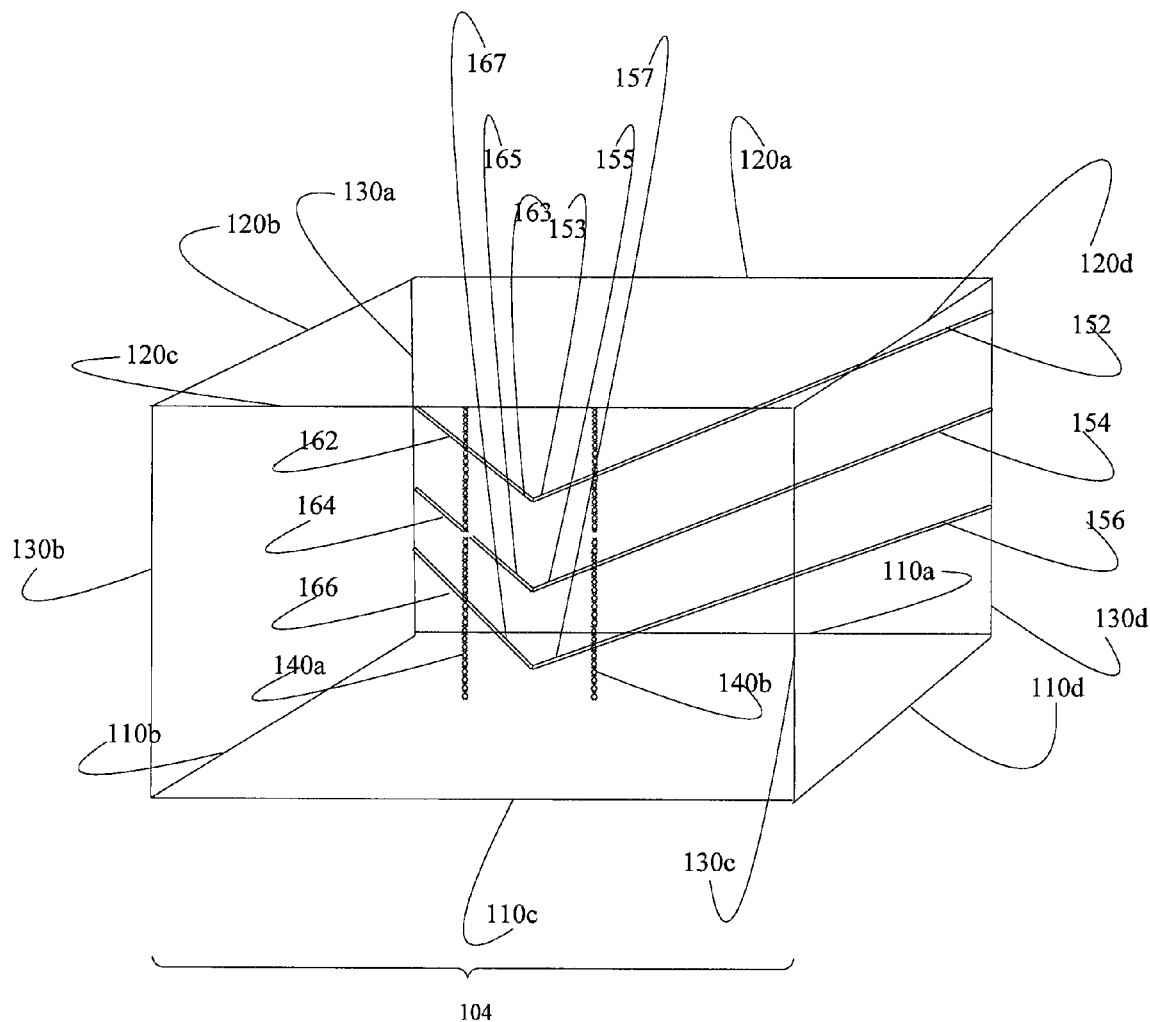
FIG. 1B is a perspective view from an exit side of Applicant's portable corral gate assembly, wherein that assembly is in a closed configuration.
Figure 1B:

FIG. 1A is a perspective view from an entry side 102 of Applicant's portable corral gate assembly in a closed configuration 100. FIG. 1B is a perspective view from an exit side 104 of Applicant's portable corral gate assembly 100, wherein exit side 104 is opposed to entry side 102, and wherein apparatus 100 is in a closed orientation.

In the illustrated embodiment of FIGS. 1A and 1B, Applicant's portable corral gate assembly 100 comprises a plurality of horizontal members, namely members 110a, 100b, 110c, and 110d, releaseably interconnected to form a bottom frame 200 (FIG. 2), a plurality of horizontal members 120, including members 120a, 120b, 120c, and 120d, releaseably interconnected to form a top frame 410 (FIG. 4), a plurality of vertical members 130, namely members 130a, 130b, 130c, and 130d, releaseably interconnecting the top frame 410 and the bottom frame 200, a first flexible member 140a and a second flexible member 140b attached to the top frame 410 and extending downwardly therefrom, a plurality of side members, namely members 152, 154, and 156, pivotally attached to vertical member 130d and flexible member 140b, and a plurality of side members, namely members 162, 164, and 166, pivotally attached to vertical member 130a and flexible member 140a.

In the illustrated embodiment of FIGS. 1A and 1B, side member 152 is pivotally attached to vertical member 130d, wherein side member 152 is attached to flexible member 140b such that distal end 153 extends outwardly from flexible member 140b. Side member 162 is pivotally attached to vertical member 130a, wherein side member 162 is attached to flexible member 140a such that distal end 163 extends outwardly from flexible member 140a. In the illustrated embodiment of FIGS. 1A and 1B, distal end 153 is disposed adjacent to distal end 163.

In the illustrated embodiment of FIGS. 1A and 1B, side member 154 is pivotally attached to vertical member 130d, wherein side member 154 is attached to flexible member 140b such that distal end 155 extends outwardly from flexible member 140b. Side member 164 is pivotally attached to vertical member 130a, wherein side member 164 is attached to flexible member 140a such that distal end 165 extends outwardly from flexible member 140a. In the illustrated embodiment of FIGS. 1A and 1B, distal end 155 is disposed adjacent to distal end 165.

In the illustrated embodiment of FIGS. 1A and 1B, side member 156 is pivotally attached to vertical member 130d, wherein side member 156 is attached to flexible member 140b such that distal end 157 extends outwardly from flexible member 140b. Side member 166 is pivotally attached to vertical member 130a, wherein side member 166 is attached to flexible member 140a such that distal end 167 extends outwardly from flexible member 140a. In the illustrated embodiment of FIGS. 1A and 1B, distal end 157 is disposed adjacent to distal end 167.

Figure 1C:
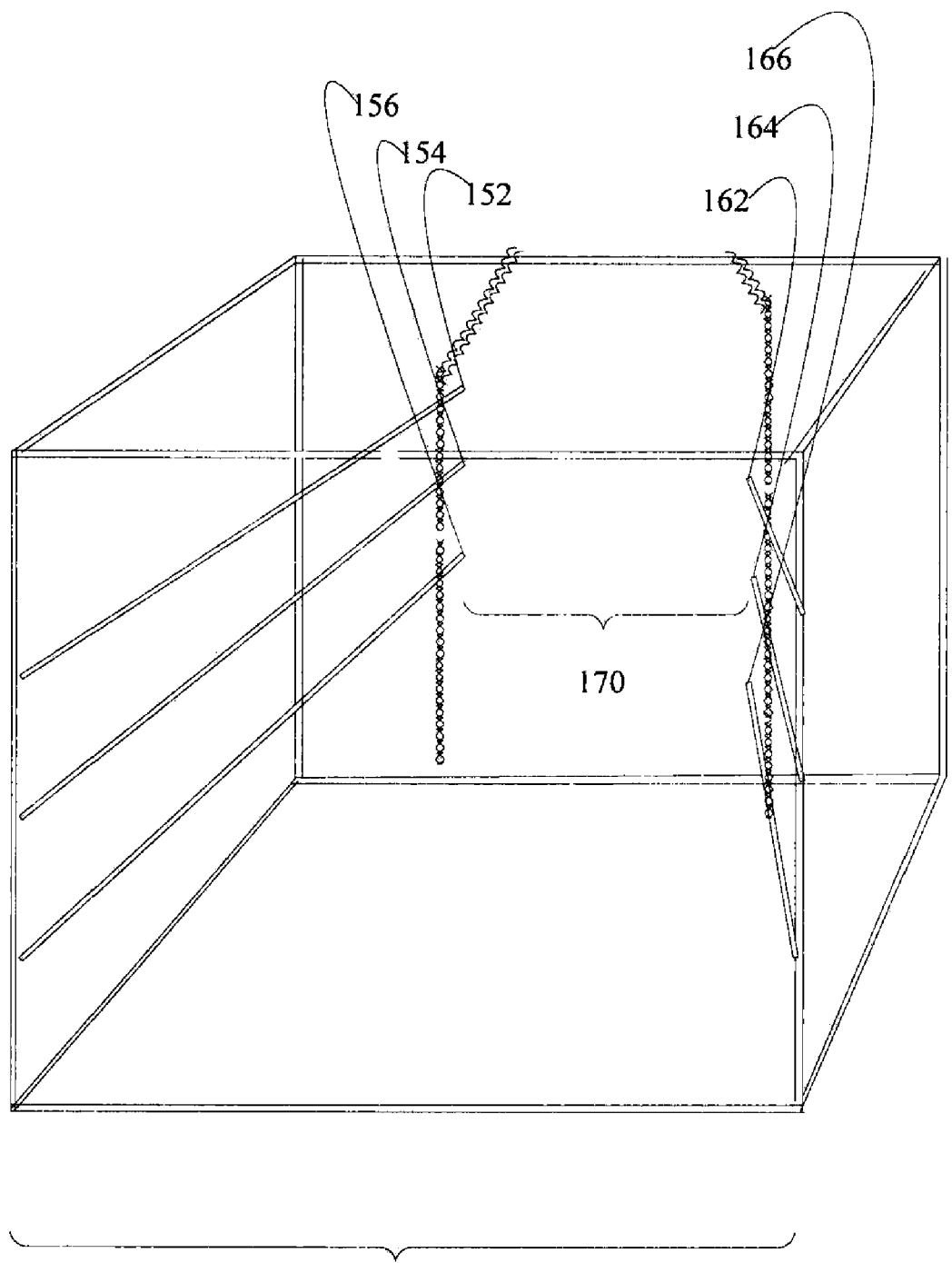
FIG. 1C is a perspective view from an entry side of Applicant's portable corral gate assembly, wherein that assembly is in an open configuration.
Figure 1D:
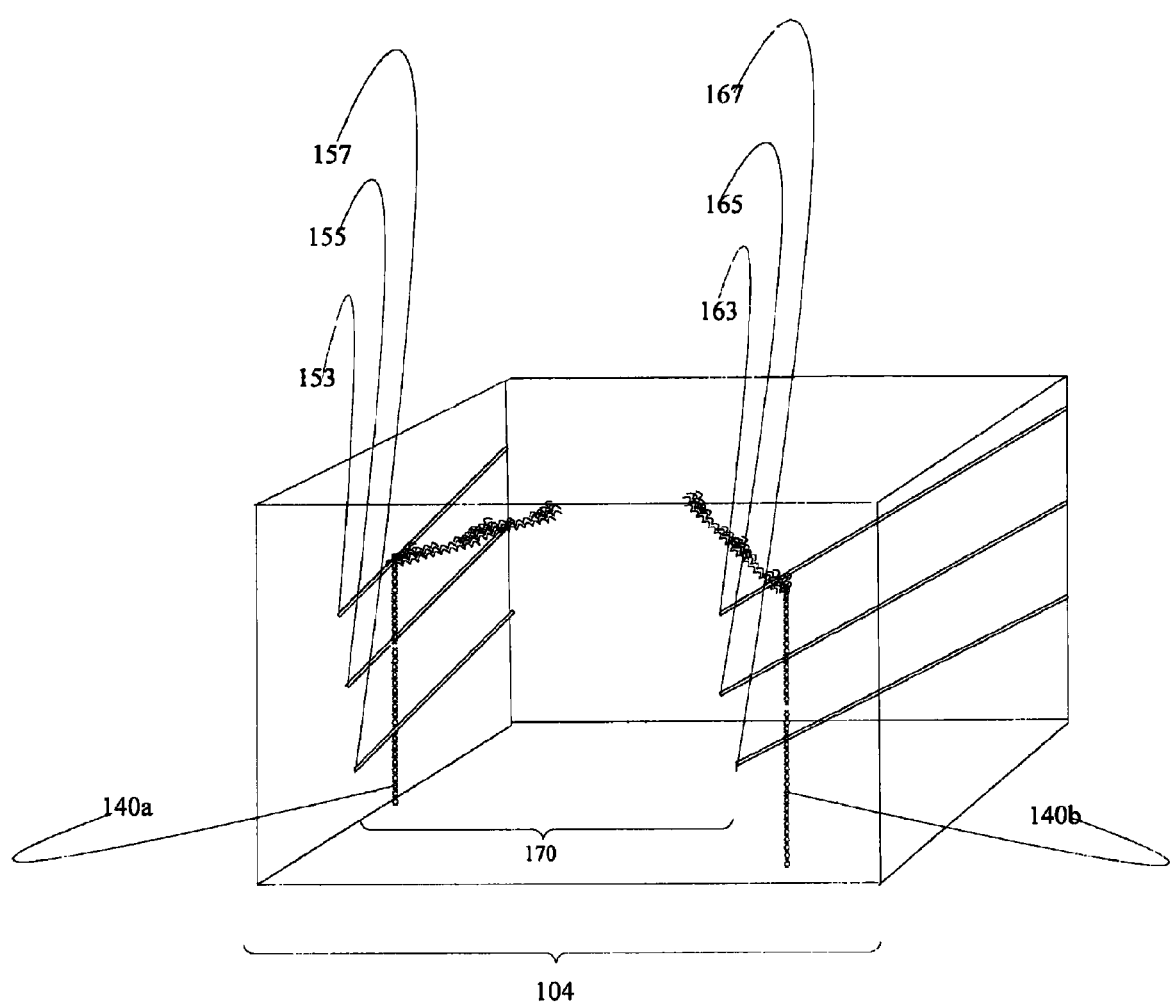
FIG. 1D is a perspective view from an exit side of Applicant's portable corral gate assembly, wherein that assembly is in an open configuration.

FIGS. 1C and 1D show Applicant's portable corral gate assembly in an open configuration 102. The gravitational force keeps Applicant's portable corral gate assembly in the closed configuration of FIGS. 1A and 1B. The plurality side members 152, 154, and 156 and the plurality of side members 162, 164, and 166 can be manually moved outwardly from the closed configuration of FIGS. 1A and 1B to the open configuration of FIGS. 1C and 1D. Animals, such as for example and without limitation cattle, may enter the entry side of Applicant's portable corral gate assembly. As each animal walks toward the exit side of the apparatus, the animal's body moves the plurality side members 152, 154, and 156 and the plurality of side members 162, 164, and 166 outwardly from the closed configuration of FIGS. 1A and 1B to the open configuration of FIGS. 1C and 1D. After the animal leaves the exit side of Applicant's portable corral gate assembly, gravity returns the plurality of side members 152, 154, and 156 and 162, 164, and 166 to the closed configuration of FIGS. 1A and 1B.

Thus, an animal can pass through Applicant's portable corral gate assembly from the entry side to the exit side. Referring now to FIG. 1B, an animal cannot, however, pass through Applicant's portable corral gate assembly from the exit side to the entry side. When approaching Applicant's portable corral gate assembly from the exit side, the distal ends of the plurality of side members 152, 154, and 156 meet corresponding distal ends of the plurality of side members 162, 164, and 166, thereby forming what appears to the animal to be a continuous structure blocking the exist side. Therefore, an animal cannot make entry into Applicant's portable corral gate assembly from the exit side.

In certain embodiments, one or more of the plurality of horizontal members, one or more of the plurality of horizontal members 120, one or more of the plurality of vertical members 130, one or more of the plurality of side members 152, 154, and 156, and/or one or more of the plurality of side members 162, 164, and 166, are formed from a rigid material, such as wood, plastic, metal, and combinations thereof. In certain embodiments, one or more of the plurality of horizontal members, one or more of the plurality of horizontal members 120, one or more of the plurality of vertical members 130, one or more of the plurality of side members 152, 154, and 156, and/or one or more of the plurality of side members 162, 164, and 166, comprise tubular members formed from a rigid material, such as wood, plastic, metal, and combinations thereof.

In certain embodiments, one or more of the plurality of horizontal members, one or more of the plurality of horizontal members 120, one or more of the plurality of vertical members 130, one or more of the plurality of side members 152, 154, and 156, and/or one or more of the plurality of side members 162, 164, and 166, comprise tubular members formed from an engineering plastic. By "engineering plastic," Applicant means a polymeric material comprising a tensile modulus of about 500,000 psi or greater, and/or a flexural modulus of about 500,000 psi or greater. Such polymeric materials include, without limitation, one or more polyamides, one or more polycarbonates, one or more polyimides, one or more polyetheretherketones, one or more cured epoxy resins, and the like.

In certain embodiments, Applicant's tubular members are formed from stainless steel. As those skilled in the art will appreciate, stainless steel is defined as an iron-carbon alloy with a minimum of 10.5% chromium content. In certain embodiments, said members comprise aluminum.

Figure 2:
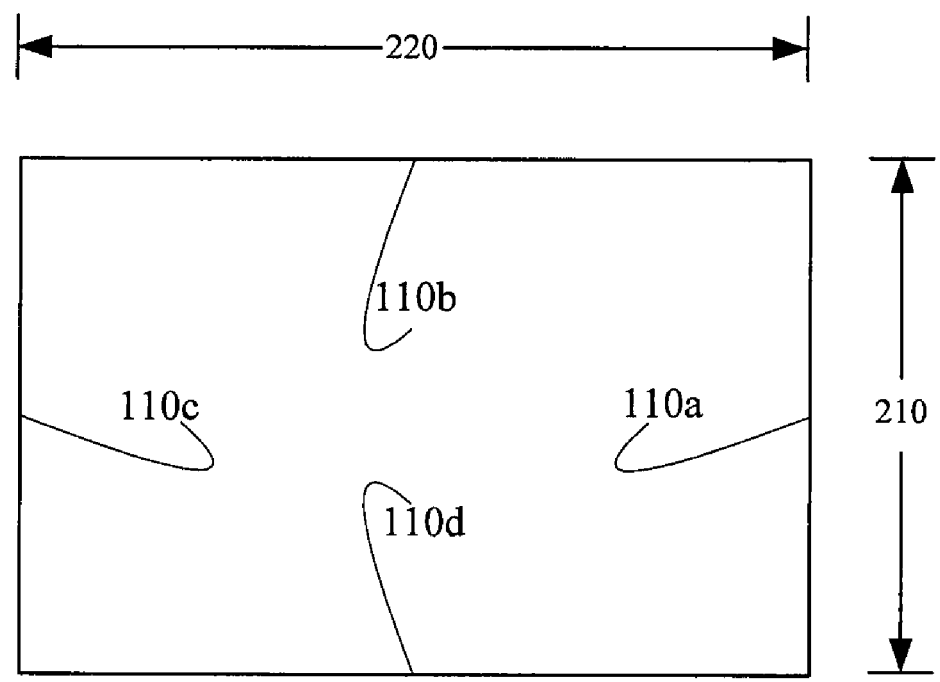
FIG. 2 is a perspective view of the bottom frame.
Figure 2:

Referring now to FIG. 2, bottom frame 200 is formed using horizontal members 110a, 110b, 110c, and 110d, wherein each end of each horizontal member is releaseably attached to one end of a different horizontal member. By "releaseably attached," Applicant means attached using, for example and without limitation, nuts and bolts.

In the illustrated embodiment of FIG. 2, bottom frame 200 comprises a rectangular cross section, wherein length 220 does not equal width 210. In certain embodiments, bottom frame 200 comprises a square cross-section, wherein length 220 equals width 210. In certain embodiments, length 220 is between about 6 feet and about 8 feet. In certain embodiments, width 210 is between about 5 feet and about 7 feet.

Figure 3:
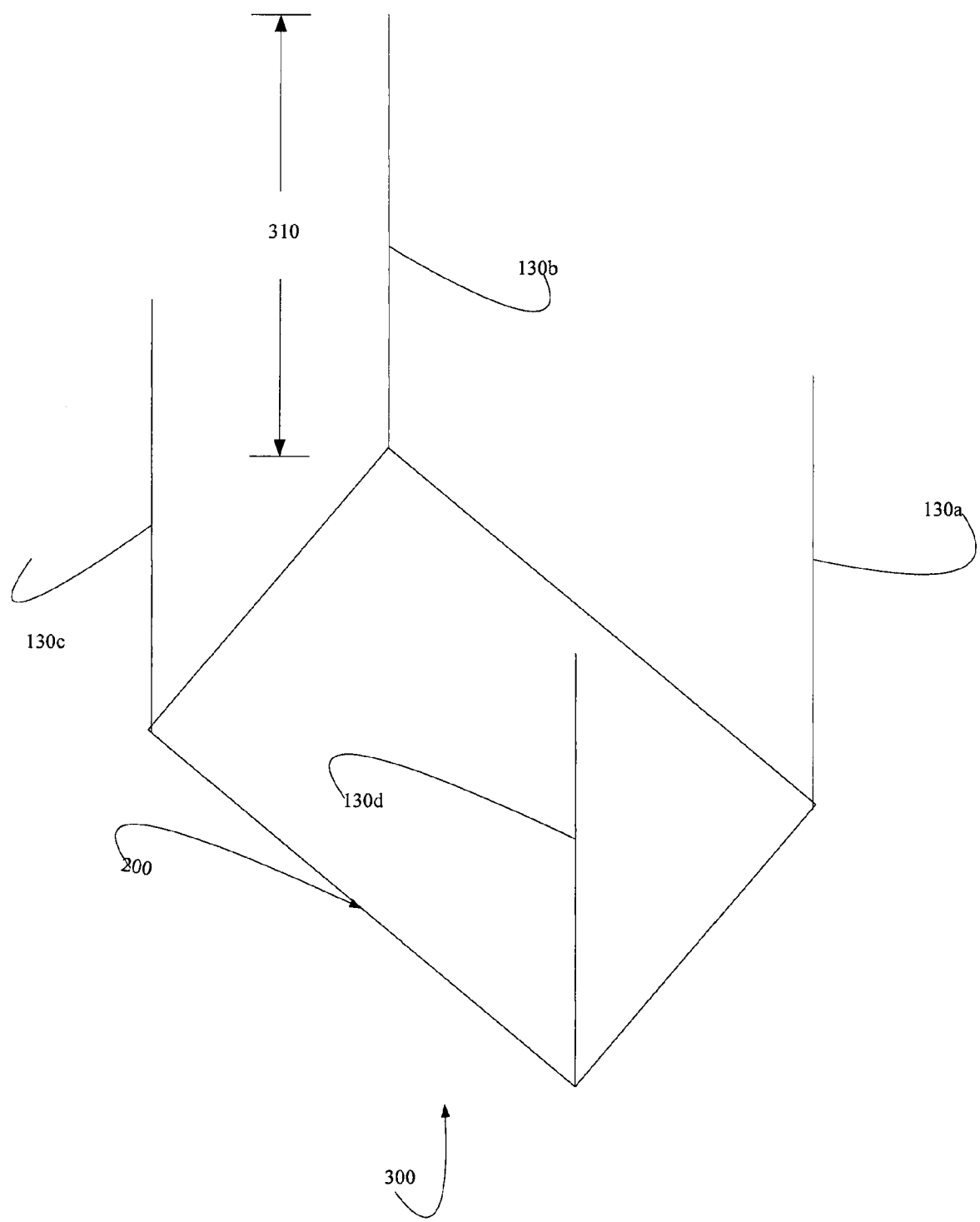
FIG. 3 illustrates a bottom frame comprising 4 members releaseably attached to one another.

FIG. 3 illustrates subcombination 300 which is formed by releaseably attaching vertical members 130a, 130b, 130c, and 130d, to bottom frame 200. In certain embodiments, height 310 is between about 5 feet and about 7 feet.

Figure 4:
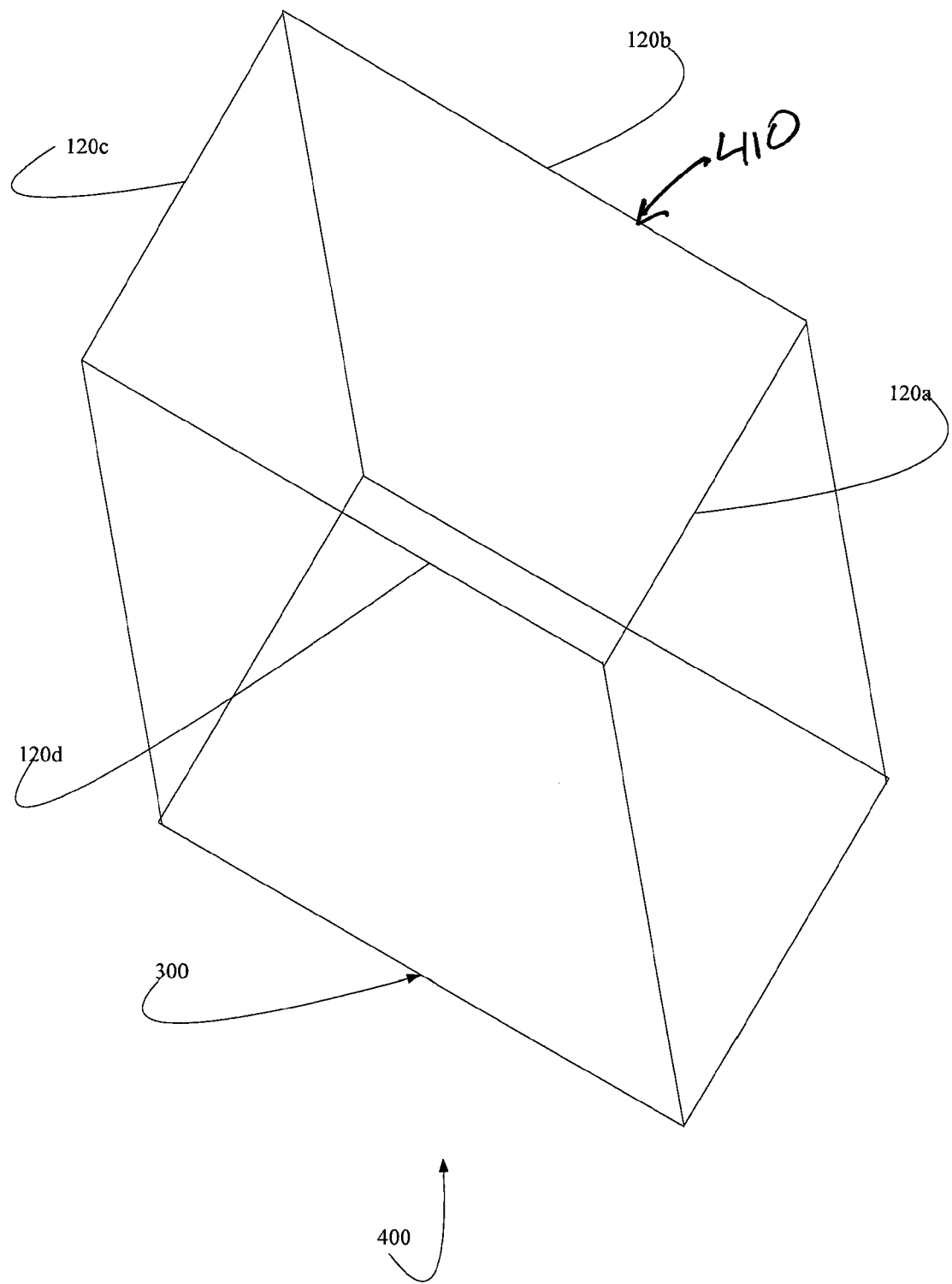
FIG. 4 illustrates a first subcombination comprising four vertical members attached to the bottom frame of FIG. 3.
Figure 5:
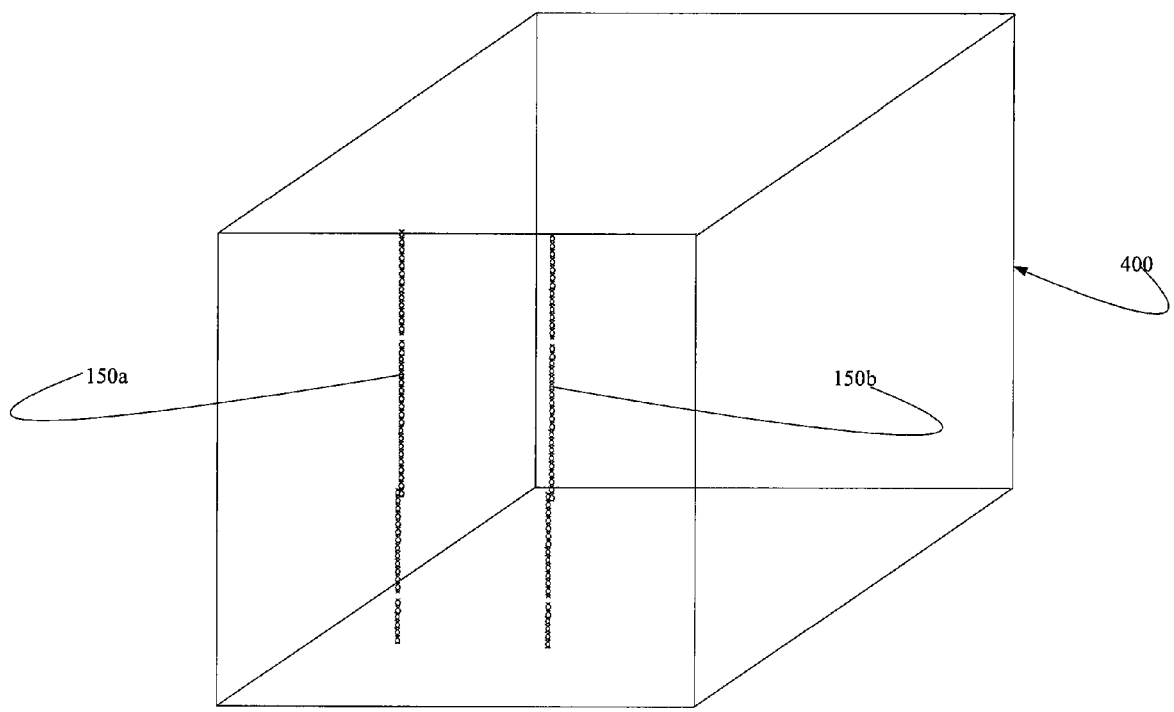
FIG. 5 illustrates a second subcombination comprises a top frame releaseably attached to the first subcombination of FIG. 4.

FIG. 4 illustrates subcombination 400 which is formed by releaseably attaching a top frame comprising members 120a, 120b, 120c, and 120d, to subcombination 300 of FIG. 3. FIG. 5 illustrates subcombination 500 which is formed by attaching flexible members 150a and 150b to the subcombination 400 of FIG. 4. In certain embodiments, flexible members 150a and 150b comprise chains.

Applicant's portable corral gate assembly 100 is formed by pivotally attaching side members 152, 154, and 156, to vertical member 130d and flexible member 140b, and pivotally attaching side members 162, 164, and 166, to vertical member 130a and flexible member 140a.

Figure 6:
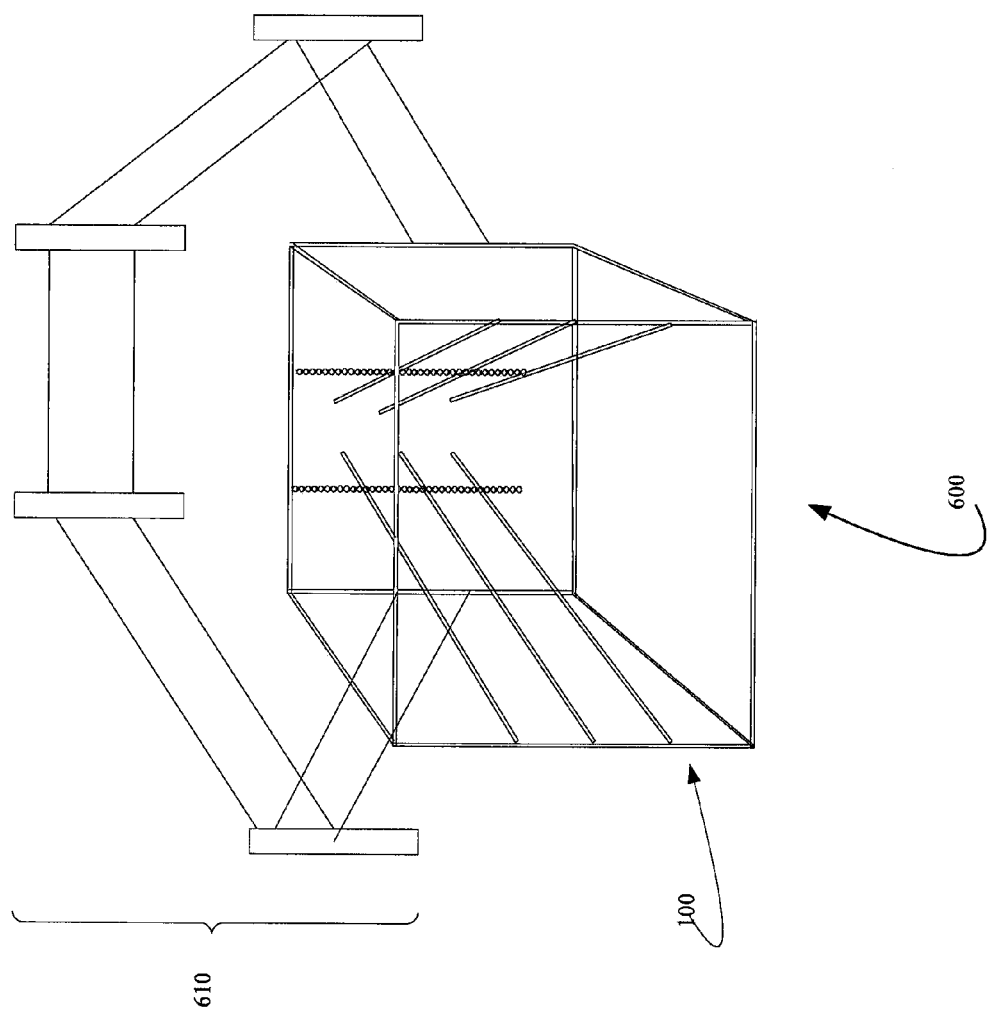
FIG. 6 shows Applicant's portable corral gate assembly in combination with a corral.

FIG. 6 illustrates an enclosed space 600 formed using Applicant's corral gate assembly 100 in combination with a corral assembly 610. In certain embodiments, Applicant's corral gate assembly 100 is permanently assembled on-site, and cannot be readily disassembled. By "permanently assembled," Applicant means that the member comprising the top frame are permanently attached to one another has shown in FIG. 2 by, for example, welding, adhesive bonding, nailing, and the like.

In the illustrated embodiment of FIG. 6, corral assembly 610 is formed using a plurality of fence posts and fence rails. In other embodiments, corral assembly 610 comprises natural features, such as and without limitation a box canyon, stream bed, and the like.

In certain embodiments, Applicant's portable gate assembly comprises a photovoltaic assembly to locally generate electric power, a controller comprising, inter alia, one or more rechargeable batteries interconnected to the photovoltaic assembly, and a motion detector in communication with the controller, wherein Applicant's controller counts animals entering a corral assembly, such as and without limitation, enclosed space 800 (FIG. 8), locally stores a livestock count, and wirelessly provides that livestock count to a remote computing device. In certain embodiments, Applicant's portable gate assembly further comprises a spray apparatus in communication with Applicant's controller.

Figure 7:
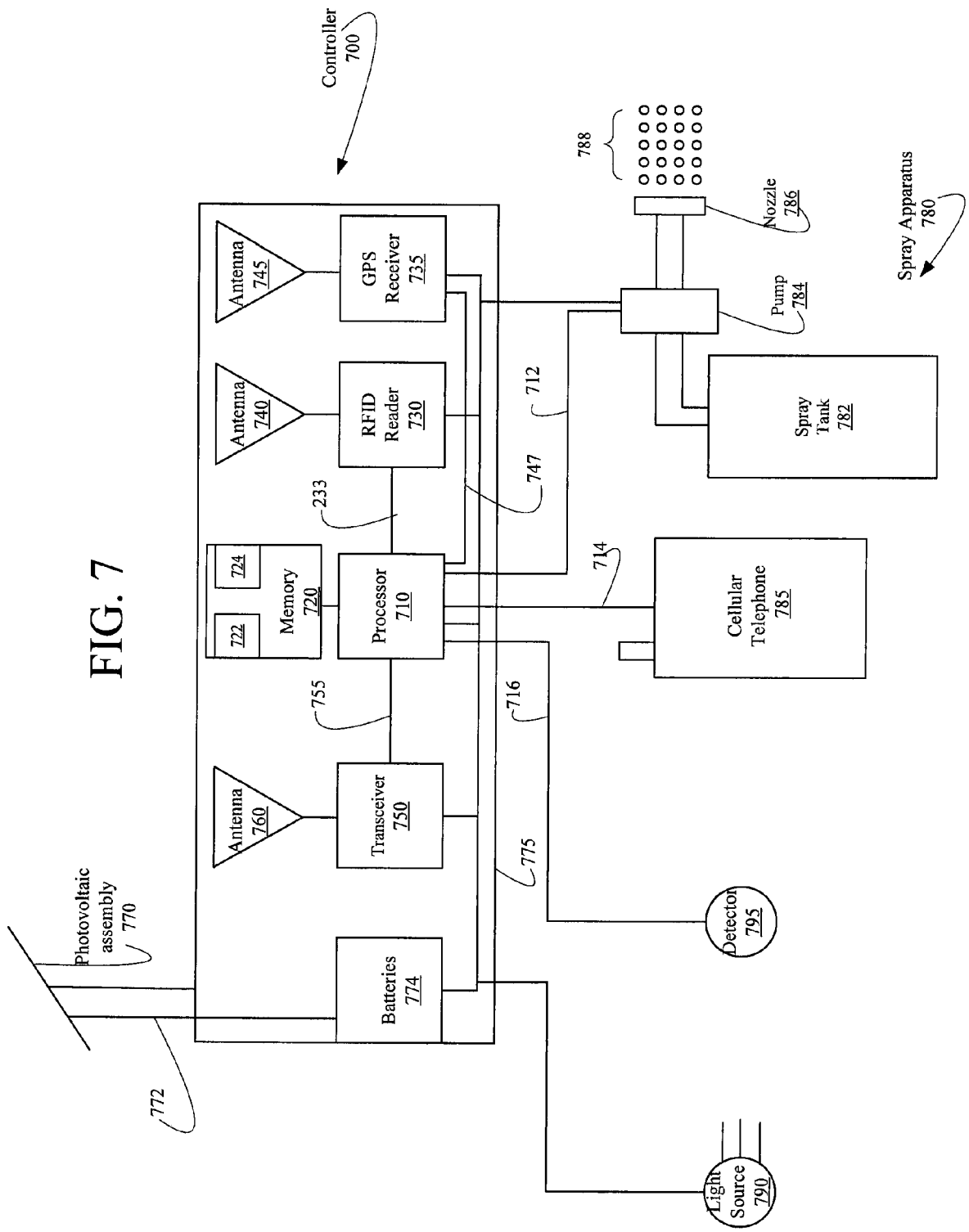
FIG. 7 illustrates the elements of Applicant's gate controller.
Figure 8:
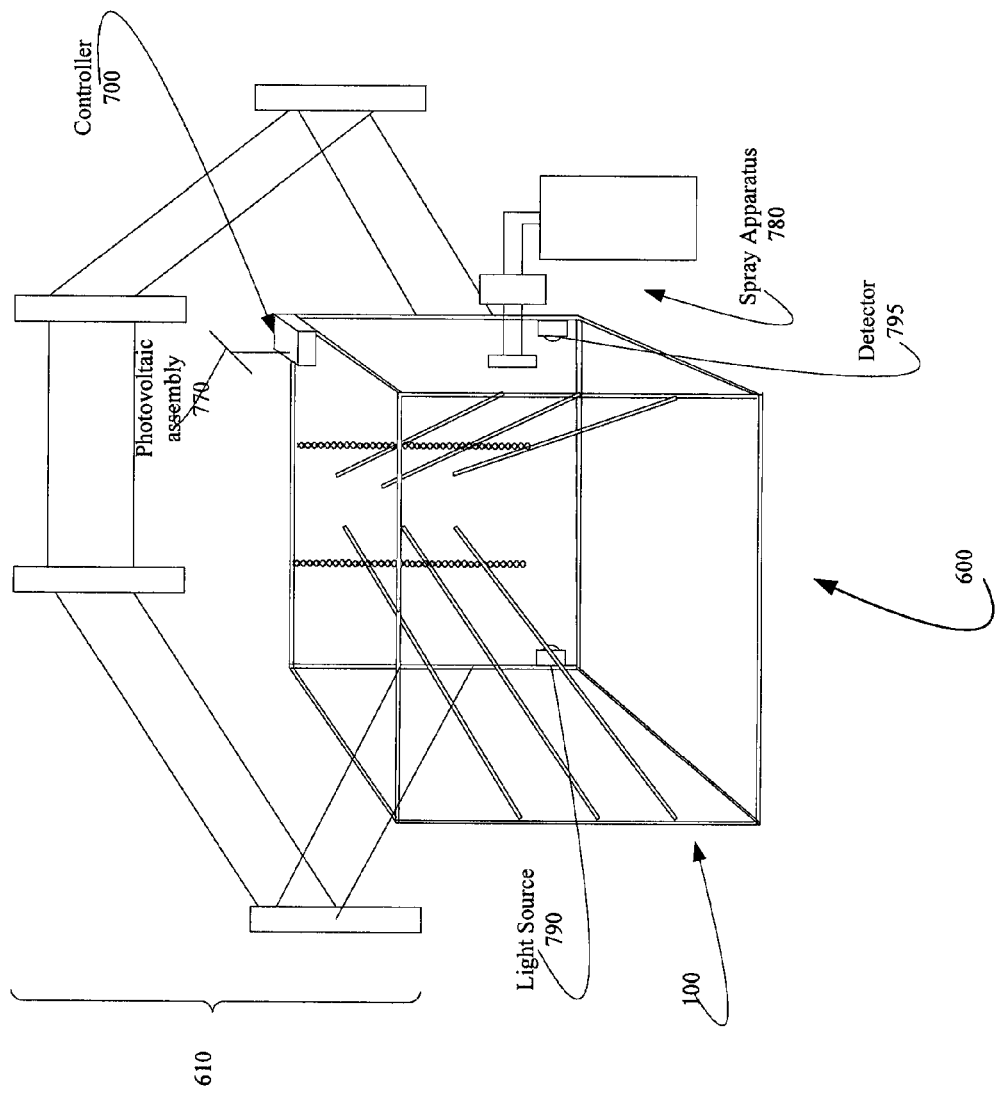
FIG. 8 shows Applicant's portable corral gate assembly and gate controller in combination with a corral.

Referring now to FIGS. 7 and 8, Applicants' controller 700 comprises processor 710, memory 720, receiver 730, antenna 760, transceiver 750, antenna 740, RFID reader 730, antenna 745, GPS Receiver 735, photovoltaic assembly 770, and cellular telephone 785. As those skilled in the art will appreciate, photovoltaics comprise an apparatus and method using that apparatus to generate electricity using solar cells packaged in photovoltaic modules, often electrically connected in multiples as solar photovoltaic arrays to convert energy from the sun into electricity.

By "photovoltaic," Applicant means the unbiased operating mode of a photodiode in which current through the device is entirely due to the transduced light energy. Solar cells produce direct current electricity from light, which can be used to power equipment or to recharge a battery.

In certain embodiments, Applicant's controller 700 comprises a motion detector 795. In certain embodiments, the motion detector 795 comprises a photocell which operates in combination with light source 790.

In the illustrated embodiment of FIG. 7, processor 710 is interconnected with spray assembly 780 via communication link 712. Spray assembly 780 comprises a spray tank 782, wherein a liquid is disposed in tank 782, a pump 784, and nozzle 786. When pump 786 is activated, pump 784 withdraws liquid from tank 782 and propels that liquid outwardly through nozzle 786 to form a spray 788. In certain embodiments, spray 788 comprises a wormer. In certain embodiments, spray 788 comprises a parasiticides. In certain embodiments, spray 788 comprises a fly spray.

In the illustrated embodiment of FIG. 7, processor 710 is interconnected with detector 295 via communication link 716. Batteries 774 is interconnected with memory 720, processor 710, RFID reader 730, GPS Receiver 735, Transceiver 750, Pump 784, and Light Source 790, via power bus 775. In certain embodiments, batteries 775 comprise one or more rechargeable batteries.

RFID Reader 730 is interconnected with processor 710 via communication link 735. Transceiver 750 is interconnected with processor 710 via communication link 755. Memory 720 is interconnected with processor 210 via communication link 725. Communication links 725, 735, and 755, may comprise any type of I/O interface, for example and without limitation, a serial connection, parallel connection, Fibre Channel, Infiniband, Gigabit Ethernet, Ethernet, iSCSI, SCSI I/O interface, and the like.

Microcode/operating system 722 is encoded in memory 720. Livestock count 724 is stored in memory 720. Processor 710 utilizes microcode/operating system 722 to operate vehicle controller 700.

When an animal enters enclosed space 800 through Applicant's portable gate assembly 100, motion detector 795 detects that entry and provides a signal to processor 710. Processor 710 then increments livestock count 724 encoded in computer readable medium 720. In certain embodiments, each animal entering Applicant's enclosed space 800 wears a livestock tag comprising a RFID tag. In these embodiments, RFID reader 730 detects that RFID tag, and provides a unique identification number encoded in the RFID tag to processor 710. In these embodiments, processor 710 encodes that unique identification number in computer readable medium 724, and increments livestock count 724.

Microcode/operating system 722 comprises computer readable program code that causes processor 710 to wirelessly provide livestock count 724 wirelessly to a remote computing device disposed in, for example, a ranch office. In certain embodiments, processor 710 utilizes transceiver 750 to wirelessly provide livestock count 724 to the remote computing device. In certain embodiments, processor 710 utilizes cellular telephone 785 to provide the livestock count to a ranch office by telephone.

In certain embodiments, when motion detector 795 detects movement of an animal through Applicant's gate assembly 100, and/or RFID Reader 730 detects movement of an animal through Applicant's gate assembly, processor 710 energizes pump 784, and spray 788 is directed onto the animal as it moves through gate assembly 100.

In certain embodiments, memory 720 comprises an information storage medium comprising, for example, a magnetic information storage medium, an optical information storage medium, an electronic information storage medium, and the like, in combination with hardware to read information from that information storage medium. By "electronic storage media," Applicants mean, for example, a device such as a PROM, EPROM, EEPROM, Flash PROM, compactflash, smartmedia, and the like. In certain embodiments, memory 720 comprises nonvolatile memory.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A portable corral gate assembly, comprising:
    a plurality of first horizontal members comprising a bottom frame;
    a corresponding plurality of second horizontal members comprising a top frame;
    a plurality of vertical members interconnected to said bottom frame and said top frame;
    a first flexible member having a first end attached to one of said plurality of second horizontal members and extending downwardly therefrom;
    a second flexible member having a first end attached to said one of said plurality of second horizontal members and extending downwardly therefrom;
    a plurality of first side members each having a first end pivotally attached to a first one of said plurality of vertical members and a second end attached to and extending outwardly from said first flexible member;
    a plurality of second side members each having a first end pivotally attached to a second one of said plurality of vertical members and a second end attached to and extending outwardly from said second flexible member;
    wherein:
    said first vertical member is disposed adjacent said second vertical member;
    said first vertical member and said second vertical member define an entry side;
    said first one of said plurality of vertical members is attached to a third one of said plurality of vertical members and a fourth one of said plurality of vertical members;
    said third vertical member and said fourth vertical member define an exit side;
    wherein said bottom frame comprises:
    a first member comprising a first end and a second end;
    a second member comprising a first end and a second end, wherein said first end of said second member is releaseably attached to said first end of said first member;
    a third member comprising a first end and a second end, wherein said first end of said third member is releaseably attached to said second end of said first member;
    a fourth member comprising a first end and a second end, wherein said first end of said fourth member is releaseably attached to said second end of said second member, and wherein said second end of said fourth member is releaseably attached to said second end of said third member.

2. The portable corral gate assembly of claim 1, wherein said plurality of first horizontal members, plurality of second horizontal members, plurality of vertical members, first plurality of side members, and second plurality of side members, are formed from a rigid material.

3. The portable corral gate assembly of claim 2, wherein said flexible members each comprise a metal chain.

4. The portable corral gate assembly according to claim 1, wherein said top frame comprises:
    a fifth member comprising a first end and a second end;
    a sixth member comprising a first end and a second end, wherein said first end of said sixth member is releaseably attached to said first end of said fifth member;

a seventh member comprising a first end and a second end, wherein said first end of said seventh member is releaseably attached to said second end of said fifth member;

a eighth member comprising a first end and a second end, wherein said first end of said eighth member is releaseably attached to said second end of said sixth member, and wherein said second end of said eighth member is releaseably attached to said second end of said seventh member.

5. The portable corral gate assembly of claim 4, wherein said first member, said second member, said third member, said fourth member, said fifth member, said sixth member, said seventh member, and said eighth member, each comprise a tubular member.

6. The portable corral gate assembly of claim 5, wherein said first member, said second member, said third member, said fourth member, said fifth member, said sixth member, said seventh member, and said eighth member, are each formed from an engineering plastic.

7. The portable corral gate assembly of claim 6, wherein said first member, said second member, said third member, said fourth member, said fifth member, said sixth member, said seventh member, and said eighth member, each comprise a same length.

8. The portable corral gate assembly of claim 1, further comprising:
   a photovoltaic assembly;
   one or more rechargeable batteries interconnected to said photovoltaic assembly;
   a processor interconnected to said one or more rechargeable batteries;
   a motion detector in communication with said processor; and
   a transceiver in communication with said processor.

9. The portable corral gate assembly of claim 8, further comprising a cellular telephone in communication with said processor.

10. The portable corral gate assembly of claim 9, further comprising a RFID reader in communication with said processor.

11. The portable corral gate assembly of claim 10, further comprising a spray assembly comprising:
   a spray tank;
   a pump in communication with said spray tank;
   a nozzle in communication with said pump;
   wherein said pump is interconnected to said one or more rechargeable batteries, and wherein said pump is in communication with said processor.

* * * * *